United States Patent
Ikarashi et al.

(10) Patent No.: US 11,646,880 B2
(45) Date of Patent: May 9, 2023

(54) SECRET COMPUTATION METHOD, SECRET COMPUTATION SYSTEM, SECRET COMPUTATION APPARATUS, AND PROGRAM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 143 days.

(21) Appl. No.: 16/475,236

(22) PCT Filed: Jan. 17, 2018

(86) PCT No.: PCT/JP2018/001135
§ 371 (c)(1),
(2) Date: Jul. 1, 2019

(87) PCT Pub. No.: WO2018/135511
PCT Pub. Date: Jul. 26, 2018

(65) Prior Publication Data
US 2019/0349193 A1 Nov. 14, 2019

(30) Foreign Application Priority Data

Jan. 18, 2017 (JP) .............................. JP2017-006355

(51) Int. Cl.
*H04L 9/08* (2006.01)
(52) U.S. Cl.
CPC ............ *H04L 9/0869* (2013.01); *H04L 9/085* (2013.01)

(58) Field of Classification Search
CPC ....... H04L 9/00; H04L 9/0869; H04L 9/0861; H04L 9/085; G09C 1/00
(Continued)

(56) References Cited

U.S. PATENT DOCUMENTS 4,975,867 A * 12/1990 Weng ...................... G06F 7/726
 708/492
6,038,581 A * 3/2000 Aoki ....................... G06F 7/724
 708/492

(Continued)

FOREIGN PATENT DOCUMENTS

EP 2 391 052 A1 11/2011
WO WO 2016/104476 A1 6/2016

OTHER PUBLICATIONS

Peeter Laud (Editor), Applications of Secure Multiparty Computation—(Chapter 5 and 9), © 2015 The authors and IOS Press. (Year: 2015).*

(Continued)

*Primary Examiner* — Kambiz Zand
*Assistant Examiner* — Mahabub S Ahmed
(74) *Attorney, Agent, or Firm* — Oblon, McClelland, Maier & Neustadt, L.L.P.

(57) ABSTRACT

A power is computed at high speed with a small number of communication rounds. A secret computation system that includes three or more secret computation apparatuses computes a share $[a^v]$ of the v-th power of data "a" from a share $[a]$ of data "a" while data "a" is concealed. The share $[a]$ of data "a" and an exponent v are input to an input unit (step S11). A local operation unit computes the $p^u$-th power of a share $[a^r]$ of the t-th power of data "a" without communication with the other secret computation apparatuses (step S12). A secret computation unit uses secret computation that (Continued)

requires communication with the other secret computation apparatuses to compute a multiplication in which at least one of the multiplicands is $$[a^{(t*p^\wedge u)}],$$

the computation result of the local operation unit, to obtain the share $[a^v]$ (step S13). An output unit outputs the share $[a^v]$ (step S14).

8 Claims, 4 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 6,810,122 | B1 * | 10/2004 | Miyazaki | H04L 9/085 380/42 |
| 7,218,735 | B2 * | 5/2007 | Coron | H04L 9/0841 713/180 |
| 7,415,614 | B2 * | 8/2008 | Guillou | H04L 9/3247 380/278 |
| 9,787,472 | B1 * | 10/2017 | Lampkins | H04L 9/085 |
| 10,075,288 | B1 * | 9/2018 | Khedr | H04L 9/008 |
| 10,083,310 | B1 * | 9/2018 | Lampkins | H04L 9/3093 |
| 2003/0055858 | A1 * | 3/2003 | Dubey | G06F 7/724 708/492 |
| 2007/0116283 | A1 * | 5/2007 | Tuyls | H04L 9/3013 380/255 |
| 2008/0084997 | A1 * | 4/2008 | Lauter | G06F 7/724 380/30 |
| 2009/0044080 | A1 * | 2/2009 | Michaels | G06F 7/725 714/780 |
| 2009/0136025 | A1 * | 5/2009 | Kargl | G06F 7/725 380/28 |
| 2009/0279688 | A1 * | 11/2009 | Michaels | H04L 9/0668 380/28 |
| 2010/0260333 | A1 * | 10/2010 | Akane | G06F 7/725 380/28 |
| 2011/0110525 | A1 * | 5/2011 | Gentry | H04L 9/0822 380/285 |
| 2011/0179098 | A1 * | 7/2011 | Nogami | H04L 9/3073 708/207 |
| 2011/0261955 | A1 * | 10/2011 | Nogami | H04L 9/3066 380/28 |
| 2011/0295918 | A1 * | 12/2011 | Prouff | G06F 7/724 708/250 |
| 2012/0039463 | A1 * | 2/2012 | Gentry | H04L 9/0816 380/28 |
| 2012/0254605 | A1 * | 10/2012 | Sun | G09C 1/00 713/150 |
| 2013/0080493 | A1 * | 3/2013 | Gueron | G06F 7/728 708/491 |
| 2013/0339728 | A1 * | 12/2013 | Ikarashi | G06F 21/602 713/164 |
| 2014/0294181 | A1 * | 10/2014 | Kamano | G10L 19/008 704/500 |
| 2015/0358155 | A1 * | 12/2015 | Ikarashi | H04L 9/085 713/189 |
| 2016/0365973 | A1 * | 12/2016 | van Deventer | H04L 9/0625 |
| 2017/0012948 | A1 * | 1/2017 | Peeters | H04L 9/3247 |
| 2017/0365192 | A1 | 12/2017 | Ikarashi | |
| 2018/0115415 | A1 * | 4/2018 | Teranishi | G06F 21/602 |
| 2018/0276417 | A1 * | 9/2018 | Cerezo Sanchez | G06F 8/41 |
| 2019/0212986 | A1 * | 7/2019 | Araki | H04L 9/085 |
| 2019/0372768 | A1 * | 12/2019 | Veeningen | H04L 9/14 |
| 2020/0186528 | A1 * | 6/2020 | Fan | G06F 17/16 |

OTHER PUBLICATIONS

Ishai et al., Secure Multiparty Computation with Minimal Interaction, International Association for Cryptologic Research 2010 (Year: 2010).*
Avanzi, On Multi-Exponentiation in Cryptography; mocenigo@exp-math.uni-essen.de; from scholar.google.com (Year: 2002).*
Nedjah et al.; High-performance SoC-based implementation of modular exponentiation using evolutionary addition chains for efficient cryptography; ScienceDirect.com (Year: 2010).*
Peeter Laud (Editor); Applications of Secure Multiparty Computation—(Chapter 5 and 9), © 2015 The authors andl OS Press. (Year: 2015).*
Ghodosi et al.; Multi-party computation with conversion of secret sharing; Springer (Year: 2011).*
Toft; Primitives and Applications for Multi-party Computation; PhD Dissertation—Department of Computer Science, Universityof Aarhus Denmark (Year: 2007).*
Ishai et al.; Secure Multiparty Computation with Minimal Interaction; International Association for Cryptologic Research (Year: 2010).*
Araki, T. et al., "High-Throughput Semi-Honest Secure Three-Party Computation with an Honest Majority", Proceedings of the 2016 ACM SIGSAC Conference on Computer and Communications Security (CCS' 16), Oct. 2016 (retrieved from the Internet on Mar. 9, 2018) <URL:http://doi.org/10.1145/2976749.2978331>, 13 pages.
Araki, D. et al., "MEVAL2 vs. CCS Best paper on MPC-AES", 2017 Symposium on Cryptography and Information Security (SCIS), Naha, Japan, Jan. 24-27, 2017, The Institute of Electronics Information and Communication Engineers, 9 pages, with English Abstract.
Ivan Damgard, et al., Secure Multiparty AES (full paper), XP61003706, IACR, Dec. 11, 2009, pp. 1-14.
Joachim Von Zur Gathen, "Processor-Efficient Exponentiation in Finite Fields" Information Processing Letters, vol. 41, No. 2, XP55766522, Feb. 14, 1992, pp. 81-86.
Extended European Search Report dated May 7, 2020, in Patent Application No. 18741847.0, citing documents AA, AO and AX-AY therein, 9 pages
Kato, H. et al., "Fast Exponentiation in Extension Field with Frobenius Mappings", Memoirs of the Faculty of Engineering, vol. 42, Jan. 1, 2008, pp. 36-43.
Gentry, C. et al., "Fully Homomorphic Encryption with Polylog Overhead", International Association for Cryptologic Research, XP061005753, vol. 20120405, Apr. 5, 2012, 40 pages.
International Search Report dated Apr. 3, 2018, in PCT/JP2018/001135 filed on Jan. 17, 2018.
Ikarashi, D. et al., "Actively Private and Correct MPC Scheme in $t < n/2$ from Passively Secure Schemes with Small Overhead", IACR Cryptology ePrint Archive, vol. 2014, May 19, 2014 (retrieved from the Internet on Mar. 9, 2018) <URL:http://ia.cr/2014/304>, 18 pages.
Araki, T. et al., "High-Throughput Semi-Honest Secure Three-Party Computation with an Honest Majority", Proceedings of the 2016 ACM SIGSAC Conference on Computer and Communications Security (CCS' 16), Oct. 2015 (retrieved from the internet on Mar. 9, 2018) <URL:http://doi.org/10.1145/2976749.2978331>, 13 pages.
Ikarashi, D.. et al., "MEVAL2 vs. CCS Best paper on MPC-AES", 2017 Symposium on Cryptography and Information Security (SCIS). Naha, Japan, Jan. 24-27, 2017. The Institute of Electronics Information and Communication Engineers, 9 pages, with English Abstract.
Ikarashi. D., et al., "MEVAL2 vs. CCS Best paper on MPC-AES", 2017 Symposium on Cryptography and Information Security (SCIS), Naha. Japan, Jan. 24-27, 2017, The Institute of Electronics Information and Communication Engineers. 9 pages (reference previously filed, now submitting unedited computer generated English translation only).
Craig Gentry, Shai Halevi and Nigel Smart, "Homomorphic Evaluation of the AES Circuit." Downloaded by EPO on Jun. 15. 2012.
Fabrizio De Santis, Tobias Bauer and Georg Sigl. "Hiding Higher-Order Univariate Leakages by Shuffling Polynomial Masking Schemes.

(56) References Cited

OTHER PUBLICATIONS

A More Efficient, Shuffled, and Higher-Order Masked AES S-box." DOI:http://dx.doi.org/10.114512996366.2996370. Oct. 24, 2016. Vienna, Austria.

Ivan Damgard, Marcel Keller Enrique Larraia, Christian Miles, Nigel P. Smart. "Implementing AES via an Actively/Covertly Secure Dishonest-Majority MPC Protocol" Department of Computer Science, University of Aarhus: Department of Computer Science. University of Bristol Visconti and R. De Prisco (Eds.) SCN 2012. LNCS 7485. pp. 241-263, 2012.

HeeSeok Kim, Seokhie Hong and Jongin Lim "A Fast and Provable Secure Higher-Order Masking of AES S-Box." Center for Information Security Technologies, Korea University. B. Preneel and T. Takagi (Eds.): CHES 2011, LNCS 694, pp. 95-107, 2011. International Association for Cryptologic Research.

\* cited by examiner

SECRET COMPUTATION SYSTEM

SECRET COMPUTATION SYSTEM

SECRET COMPUTATION METHOD, SECRET COMPUTATION SYSTEM, SECRET COMPUTATION APPARATUS, AND PROGRAM

TECHNICAL FIELD

The present invention relates to secret computation techniques, and more specifically, to a technique that computes, while concealing data, a power of the data.

BACKGROUND ART

Secret computation technology for analyzing sensitive data while concealing it, in order to share and analyze the data, has been researched. One type of such a technology uses a method called secret sharing in which data is divided into a plurality of pieces called shares. In order to perform various analyses while the data is concealed, protocols have been proposed to perform operations on the concealed data, such as multiplication, addition, and sorting (see Non-Patent Literature 1 and Non-Patent Literature 2, for example).

Suppose that a power of data is computed while the data is concealed. The Binary method is usually used to compute a power, for example, to compute $[a^9]$ from $[a]$, wherein $[a]$ indicates data "a" being concealed. The Binary method repeats multiplication to compute a desired power. The Binary method computes $[a^9]$ in the following way, wherein Mult indicates the procedure of multiplication.

1. $[a^2] \leftarrow \text{Mult}([a], [a])$
2. $[a^4] \leftarrow \text{Mult}([a^2], [a^2])$
3. $[a^8] \leftarrow \text{Mult}([a^4], [a^4])$
4. $[a^9] \leftarrow \text{Mult}([a^8], [a])$

PRIOR ART LITERATURE

Non-Patent Literature

Non-Patent Literature 1: Dai Ikarashi, Ryo Kikuchi, Koki Hamada, and Koji Chida, "Actively private and correct MPC scheme in t<n/2 from passively secure schemes with small overhead", IACR Cryptology ePrint Archive, vol. 2014, p. 304, 2014.

Non-Patent Literature 2: Toshinori Araki, Jun Furukawa, Yehuda Lindell, Ariel Nof, and Kazuma Ohara, "High-Throughput Semi-Honest Secure Three-Party Computation with an Honest Majority", ACM CCS 2016.

SUMMARY OF THE INVENTION

Problems to be Solved by the Invention

To compute a power with the Binary method, it is necessary to perform multiplication O(log m) times to compute the m-th power. In secret computation, communication is required for multiplication, which serves as a bottleneck for performance. Therefore, it is desirable that a power be computed with a smaller number of multiplication calls.

An object of the present invention is to provide secret computation technology that computes a power of data while concealing the data, with a small number of communication rounds.

Means to Solve the Problems

To solve the problems described above, a secret computation method according to a first aspect of the present invention is a secret computation method in which $GF(p^k)$ is an extended field having a characteristic of p and a degree k of field extension, a is data that is an element of the extended field $GF(p^k)$, [a] is a share obtained by applying additive secret sharing to data a, v is an integer equal to or larger than 2, and u and t are integers equal to or larger than 1 and satisfy $t*p^u \leq v$, the secret computation method computing a share $[a^v]$ of the v-th power of data a from a share [a] of data a while data a is concealed and being executed by a secret computation system that includes three or more secret computation apparatuses. The secret computation method includes computing the $p^u$-th power of a share $[a^t]$ of the t-th power of data a in a local operation unit of one of the three or more secret computation apparatuses without communication with the other secret computation apparatuses; and obtaining the share $[a^v]$ in a secret computation unit of the one of the three or more secret computation apparatuses by computing a multiplication in which at least one of the multiplicands is $$[a^{(t*p^u)}],$$

the computation result of the local operation unit, using secret computation that requires communication with the other secret computation apparatuses.

A secret computation method according to a second aspect of the present invention is a secret computation method in which $GF(p^k)$ is an extended field having a characteristic of p and a degree k of field extension, a is data that is an element of the extended field $GF(p^k)$, r is a random number that is an element of the extended field $GF(p^k)$, [a] is a share obtained by applying additive secret sharing to data a, $\langle a \rangle := ([a], [ra])$ is a randomized shared value of data a, v is an integer equal to or larger than 2, and u and t are integers equal to or larger than 1 and satisfy $t*p^u \leq v$, the secret computation method computing a randomized shared value $\langle a^v \rangle := ([a^v], [ra^v])$ of the v-th power of data a from a randomized shared value [a] of data a while data a is concealed and being executed by a secret computation system that includes three or more secret computation apparatuses. The secret computation method includes computing the $p^u$-th power of a share $[a^t]$ of the t-th power of data a in a local operation unit of one of the three or more secret computation apparatuses without communication with the other secret computation apparatuses; obtaining a randomized shared value $$\langle a^{(t*p^u)} \rangle := ([a^{(t*p^u)}], [ra^{(t*p^u)}])$$

of the computation result of the local operation unit in a randomizing unit of the one of the three or more secret computation apparatuses by multiplying $$[a^{(t*p^u)}],$$

the computation result of the local operation unit, with a share [r] of the random number r using secret computation that requires communication with the other secret computation apparatuses; and obtain the randomized shared value $\langle a^v \rangle$ in a secret computation unit of the one of the three or more secret computation apparatuses by computing a multiplication in which at least one of the multiplicands is a randomized shared value $$\langle a^{(t*p^u)} \rangle,$$

of the computation result of the local operation unit using secret computation that requires communication with the other secret computation apparatuses.

Effects of the Invention

According to the present invention, since some operations are performed locally when a power of data is computed while the data is concealed, the power is computed at high speed with a small number of communication rounds.

DETAILED DESCRIPTION OF THE EMBODIMENTS

Embodiments of the present invention will be described below in detail. Components having identical functions will be denoted by the same reference numbers in the figures, and duplication of description thereof will be omitted.

Notation

A superscript indicates a power and the sign ^ in a superscript also means a power. For example, $a^b$ means the b-th power of a, and $$a^{b^c}$$

means the $b^c$-th power of a.

Data obtained by concealing data "a" with encryption or secret sharing is called the secure text of "a" and is indicated by [a]. "a" is called the plaintext of [a]. When secret sharing is used in concealment, [a] is called a share or a shared value of data "a".

A randomized shared value of data "a" is indicated by <a>. A randomized shared value is a pair of a share [a] of data "a" and a share [ra] of the product "ra" of data "a" and a random number "r". Therefore, a randomized shared value of data "a" can be defined as: <a>:=([a], [ra]). In the randomized shared value <a>:=([a], [ra]), [a] is called the 0-th component and [ra] is called the first component. See Non-Patent Literature 1 for detecting secret falsification with randomized shared values.

A field to which data and shares belong to is called $GF(p^k)$, and hereinafter, all operations are performed on $GF(p^k)$, wherein p is called a characteristic and k is called a degree of field extension. For example, when a, b∈GF(7), a+b is obtained by adding a and b and applying mod 7 to the sum. When a, b∈$GF(2^8)$, a+b is obtained by applying XOR to the corresponding bits of a and b expressed in bits.

Additive Secret Sharing

Additive secret sharing is a secret sharing method in which data "a" is divided into the sum or difference of a plurality of shares $a_i$ (i=0, 1, . . . , m−1), as shown in the formula below, and sharing and reconstructing are performed only by addition and subtraction.

$$a = \sum_{i=0}^{m-1} \pm a_i$$

In additive secret sharing, when all of m shares $a_0, a_1, \ldots, a_{m-1}$ are obtained from some servers, the original data "a" can be reconstructed; if any of the shares $a_0, a_1, \ldots,$ and $a_{m-1}$ is not obtained, the original data "a" cannot be reconstructed.

Replicated Secret Sharing

Replicated secret sharing formed of the following Share and Rec protocols can be used as additive secret sharing. The Share protocol divides plaintext into shares, and the Rec protocol reconstructs the plaintext from the shares. In the present invention, however, any method can be used as long as the method has the characteristics of additive secret sharing, even if the method is not replicated secret sharing.

It is assumed that [a] indicates the whole share of data "a" and $[a]_i$ indicates a share held by a server "i" among the share [a]. When data "a" is divided and held by three servers (servers 0, 1, and 2), data "a" is divided into $a_0, a_1,$ and $a_2$ in advance according to the following Share protocol, and servers 0, 1, and 2 respectively store $[a]_0:=(a_0, a_1), [a]_1:=(a_1, a_2)$, and $[a]_2:=(a_2, a_0)$. When data "a" is reconstructed, at least two of the shares $[a]_0, [a]_1,$ and $[a]_2$ are collected to obtain $a_0, a_1,$ and $a_2$, and they are added to compute data "a" according to the following Rec protocol.

The Share protocol is, for example, the following protocol.

Input: a
Output: $([a]_0, [a]_1, [a]_2)$
1. $a_1, a_2 \leftarrow GF(p^k)$
2. $a_0:=a-(a_1+a_2)$
3. $[a]_i:=(a_i, a_{i+1 \bmod 3})$ for i∈{0, 1, 2}
4. return $([a]_0, [a]_1, [a]_2)$ The Rec protocol is, for example, the following protocol.

Input: $[a]_{i_0}, [a]_{i_1}$ ($i_0, i_1 \in$ {0, 1, 2})
Output: a
1. Obtain $a_0, a_1, a_2$ from $[a]_{i_0}, [a]_{i_1}$
2. return $a:=a_0+a_1+a_2$ Modification of Replicated Secret Sharing The following secret sharing can be used as a modification of replicated secret sharing.

The Share protocol is, for example, the following protocol.

Input: a
Output: $([a]_0, [a]_1, [a]_2)$
1. $a_1, a_2 \leftarrow GF(p^k)$

2. $a_0 := -(a_1 + a_2)$
3. $[a]_i := (a_i, a_{i-1 \mod 3} - a)$ for $i \in \{0, 1, 2\}$
4. return $([a]_0, [a]_1, [a]_2)$ The Rec protocol is, for example, the following protocol.
Input: $[a]_{i0}, [a]_{i1}$ ($i_0, i_1 \in \{0, 1, 2\}$)
Output: a
1. Obtain $a_{i \mod 3}, a_{i+1 \mod 3}, (a_{i+2 \mod 3} - a)$ from $[a]_{i0}, [a]_{i1}$ for some $i \in \{0, 1, 2\}$
    2. return $a := -(a_0 + a_1 + a_2)$ Definition of Operations Mult indicates multiplication in additive secret sharing. More specifically, Mult is a protocol in which, when three servers (servers 0, 1, and 2) respectively store two shares of additive secret sharing, $([a]_0, [b]_0), [b]_1)$, and $([a]_2, [b]_2)$, servers 0, 1, and 2 respectively perform communication and computation to finally obtain $[ab]_0, [ab]_1$, and $[ab]_2$. Such an operation is indicated by $[ab] \leftarrow \text{Mult}([a], [b])$. Mult can be performed by a multiplication protocol in a known secret computation. For example, the protocol described in Scheme 11 in Non-Patent Literature 1 may be used in replicated secret sharing, and a protocol described in Non-Patent Literature 2 may be used in the modification of replicated secret sharing. In the following embodiments, Scheme 11 described in Non-Patent Literature 1 is used as Mult. In that case, every time Mult is called, it is counted as one communication round.

LocalExp indicates an operation in which each server computes a power of a share owned by the server. More specifically, when servers 0, 1, and 2 respectively store $[a]_0 = (a_0, a_1), [a]_1 = (a_1, a_2)$, and $[a]_2 = (a_2, a_0)$, servers 0, 1, and 2 respectively compute $[a^u]_0 = (a^u_0, a^u_1), [a^u]_1 = (a^u_1, a^u_2)$, and $[a^u]_2 = (a^u_2, a^u_0)$ in this protocol. Such an operation is indicated by $[a^u] := \text{LocalExp}([a], u)$. Since LocalExp only computes a power of a value locally held, communication with another server does not occur.

DoubleMult indicates an operation in which two pairs of secure text are input, and the secure text in the different pairs are multiplied to obtain the resultant secure text. More specifically, $([a], [a'])$ and $([b], [b'])$ are input, and $([ab], [a'b'])$ is output. Such an operation is indicated by $([ab], [a'b']) \leftarrow \text{DoubleMult}(([a], [a']), ([b], [b']))$. DoubleMult can be performed by any known protocol. For example, such a protocol is described in Non-Patent Literature 1. In that case, every time DoubleMult is called, it is counted as one communication round. DoubleMult can be performed by performing Mult twice. More specifically, $[ab] \leftarrow \text{Mult}([a], [b])$ and $[a'b'] \leftarrow \text{Mult}([a'], [b'])$ may be performed. In that case, since the two Mult operations can be executed in parallel, one communication round is required as in DoubleMult.

Principle of the Invention

The present invention uses a characteristic called Frobenius endomorphism. This means that the following formula holds on $GF(p^u)$ for any $u \in Z$, wherein $Z$ is a set of integers.

$$(a+b)^{p^u} = a^{p^u} + b^{p^u}$$

For simplicity, $$a = \sum_{i=0}^{m-1} a_i$$

is assumed here. However, $$a = \sum_{i=0}^{m-1} \pm a_i$$

also holds even if the plus and minus signs are randomly used.

When this relationship is applied to the relationship between plaintext and shares in additive secret sharing, $(a = a_0 + a_1 + \ldots + a_{m-1})$, the following formula holds.

$$a^{p^u} = ((a_0 + a_1 + \ldots + a_{m-2}) + a_{m-1})^{p^u} \quad (1)$$
$$= (a_0 + a_1 + \ldots + a_{m-2})^{p^u} (a_{m-1})^{p^u}$$
$$= \ldots$$
$$= (a_0)^{p^u} + (a_1)^{p^u} + \ldots + (a_{m-1})^{p^u}$$

The left side of Formula (1) is plaintext "a" raised to the power of a power of a characteristic, and the right side is the sum of the shares $a_0, a_1, \ldots, a_{m-1}$, of plaintext "a", each raised to the power of a power of the characteristic. When $$a' := a^{p^{\wedge}u}$$

and $$a'_i := a_i^{p^{\wedge}u}$$

for $i = 0, 1, \ldots, m-1$ are defined, it is found from Formula (1) that the relationship, $a' = a'_0 + a'_1 + \ldots + a'_{m-1}$, between plaintext and shares in additive secret sharing holds. In other words, in order to compute $$[a^{p^{\wedge}u}]$$

from $[a]$, each party just needs to compute the $p^u$-th power of its share and does not need any communication at all.

By using this method, a power of any number can be computed at a higher speed. For example, in order to compute $[a^{96}]$ from $[a]$ in $GF(2^8)$, $$[a^{64}] = [a^{2^{\wedge}6}]$$

and $$[a^{32}] = [a^{2^{\wedge}5}]$$

are locally computed, and Mult $([a^{64}], [a^{32}])$ is computed to obtain $[a^{96}]$, as shown below. The required number of communication times is one for the Mult operation.
1. $[a^{64}] := \text{LocalExp}([a], 2^6)$
2. $[a^{32}] := \text{LocalExp}([a], 2^5)$
3. $[a^{96}] \leftarrow \text{Mult}([a^{64}], [a^{32}])$ Since the conventional Binary method requires seven Mult operations, as shown below, the above-described method achieves a much higher speed.

1. $[a^2] \leftarrow \text{Mult}([a], [a])$
2. $[a^4] \leftarrow \text{Mult}([a^2], [a^2])$
3. $[a^8] \leftarrow \text{Mult}([a^4], [a^4])$
4. $[a^{16}] \leftarrow \text{Mult}([a^8], [a^8])$
5. $[a^{32}] \leftarrow \text{Mult}([a^{16}], [a^{16}])$
6. $[a^{64}] \leftarrow \text{Mult}([a^{32}], [a^{32}])$
7. $[a^{96}] \leftarrow \text{Mult}([a^{64}], [a^{32}])$ For Detecting Falsification It has been confirmed that, in order to compute the power of a power of a characteristic $$[a^{p^{\wedge}u}]$$

from a share [a] obtained in additive secret sharing, each party needs to compute the $p^u$-th power of its share. However, when it is assumed that an attacker who tries to perform falsification in secret computation exists and the method for detecting falsification, described in Non-Patent Literature 1 is used, each party holds a randomized shared value <a>:=([a], [ra]), which is a pair of a share [a] obtained in additive secret sharing and a randomized share [ra]. Each party also holds a share [r] separately, which is obtained by applying additive secret sharing to a random number.

The input and output of the computation of the power of a power of a characteristic used when it is assumed that an attacker who tries to perform falsification exists are <a>:=([a], [ra]) and $$\langle a^{p^{\wedge}u} \rangle := ([a^{p^{\wedge}u}], [ra^{p^{\wedge}u}]),$$

respectively. If the above-described computation of the power of a power of a characteristic is directly applied to the randomized share [ra], since the first component would be $$[(ra)^{p^{\wedge}u}] = [r^{p^{\wedge}u} a^{p^{\wedge}u}],$$

not $$[ra^{p^{\wedge}u}],$$

the desired output is not obtained. Therefore, the computation of the power of a power of a characteristic is not applied to the randomized share [ra], but the computation of the power of a power of a characteristic is applied to [a], and the resultant $$[a^{p^{\wedge}u}]$$

is multiplied with [r] to obtain $$[ra^{p^{\wedge}u}].$$

In short, to obtain $$\langle a^{p^{\wedge}u} \rangle = ([a^{p^{\wedge}u}], [ra^{p^{\wedge}u}])$$

from <a>=([a], [ra]), [a] is raised to the $p^u$-th power to obtain $$[a^{p^{\wedge}u}]$$

and then Mult $$([a^{p^{\wedge}u}], [r])$$

[r]) is computed to obtain $$[ra^{p^{\wedge}u}].$$

First Embodiment

Figure 1:
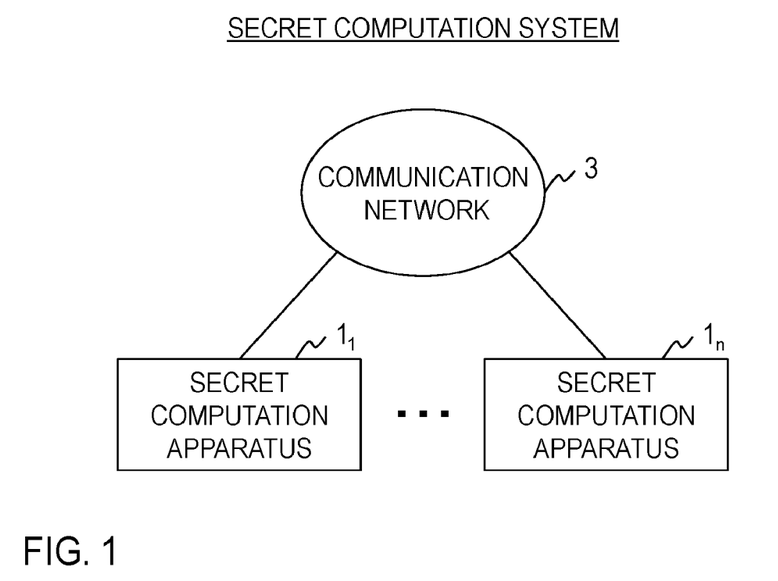
FIG. 1 is a diagram showing an example of the functional configuration of a secret computation system according to a first embodiment.

A secret computation system according to a first embodiment includes n (≥3) secret computation apparatuses $1_1$ to $1_n$, as exemplified in FIG. 1. The secret computation apparatuses $1_1$ to $1_n$ are connected separately to a communication network 3. The communication network 3 is a circuit-switching or packet-switching communication network configured to allow mutual communication between the secret computation apparatuses $1_1$ to $1_n$, and the Internet, a local area network (LAN), a wide area network (WAN) or the like can be used, for example. Each apparatus does not necessarily have to be able to perform communication online via the communication network 3. For example, information to be input to the secret computation apparatus $1_i$ (i □ {1, . . . , n}) may be stored on a portable recording medium, such as a magnetic tape or a USB memory, and may be input offline from the portable recording medium.

Figure 2:
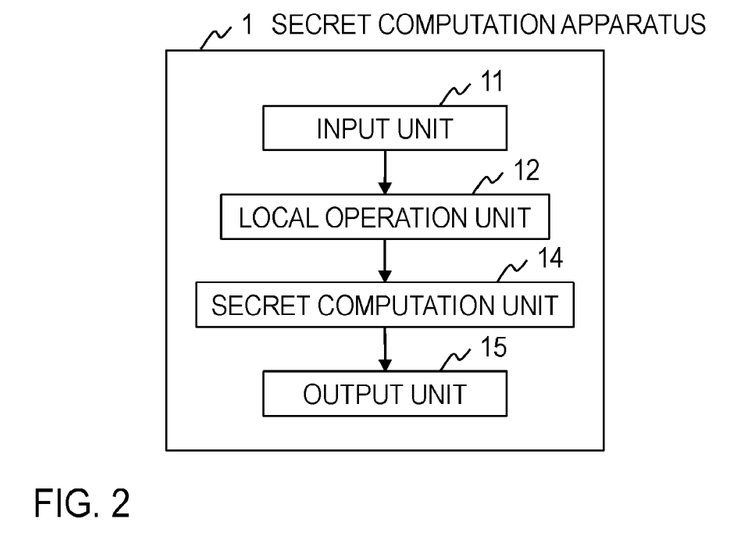
FIG. 2 is a diagram showing an example of the functional configuration of a secret computation apparatus according to the first embodiment.

The secret computation apparatus 1 includes an input unit 11, a local operation unit 12, a secret computation unit 14, and an output unit 15, as exemplified in FIG. 2. A secret computation method of the first embodiment is implemented when this secret computation apparatus 1 executes the processes of steps exemplified in FIG. 3 in cooperation with other secret computation apparatuses 1.

The secret computation apparatus 1 is, for example, a special apparatus configured by reading a special program into a known or special computer having a central processing unit (CPU), a main memory (a random access memory: RAM), and other components. The secret computation apparatus 1 executes processing under the control of the central processing unit, for example. Data input to the secret computation apparatus 1 or data obtained by processing is stored in the main memory, for example, and the data stored in the main memory is read into the central processing unit and used for other processing when necessary. At least some of the processing sections of the secret computation apparatus 1 may be configured by hardware such as integrated circuits.

Figure 3:
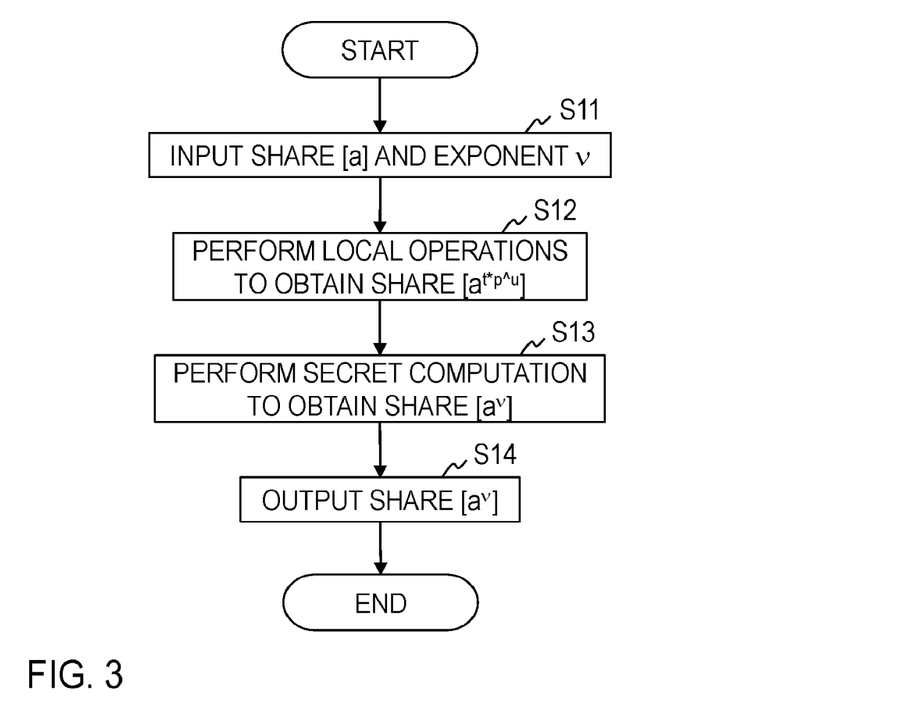
FIG. 3 is a diagram showing an example of the processing procedure of a secret computation method according to the first embodiment.

The processing procedure of the secret computation method in the first embodiment will be described below with reference to FIG. 3.

In step S11, a share [a] obtained by applying additive secret sharing to data "a", which is subjected to operations, and the exponent v (≥2) of a power to be applied to data "a"

are input to the input unit 11. The share [a] and the exponent ν are sent to the local operation unit 12.

In step S12, without performing communication with another secret computation apparatus, the local operation unit 12 computes the power of a power of a characteristic, that is, the $p^u$-th power, of a share $[a^t]$ obtained by applying additive secret sharing to the t-th power of data "a" and obtains a share $$[a^{t*p^{\wedge}u}]$$

by applying additive secret sharing to the $p^u$-th power of data "a". That is, $$[a^{t*p^{\wedge}u}] := LocalExp([a^t], p^u)$$

is computed, wherein "u" and "t" are integers equal to or larger than 1 and satisfy $t*p^u \le \nu$. The local operation unit 12 may perform executions a plurality of number of times to obtain a share $[a^\nu]$ by applying additive secret sharing to the ν-th power of data "a", but "t" equals 1 at least for the first time of execution, and the $p^u$-th power of a share [a] obtained by applying additive secret sharing to data "a" is computed.

In step S13, the secret computation unit 14 performs secret computation in cooperation with other secret computation apparatuses to multiply a share $[a^\alpha]$ obtained by applying additive secret sharing to the α-th power of data "a", with a share $[a^\beta]$ obtained by applying additive secret sharing to the β-th power of data "a". That is, $[a^{\alpha+\beta}] \leftarrow$ Mult $([a^\alpha], [b^\beta])$ is computed, wherein α and β are integers equal to or larger than 1 and satisfy $\alpha+\beta \le \nu$. Either $[\alpha^a]$ or $[a^\beta]$ is a share $$[a^{t*p^{\wedge}u}]$$

obtained in the local operation unit 12 by applying additive secret sharing to the $p^u$-th power of data "a". That is, $\alpha=t*p^u$ or $\beta=t*p^u$. The secret computation unit 14 may perform executions a plurality of number of times to obtain a share $[a^\nu]$ by applying additive secret sharing to the ν-th power of data "a".

In step S14, when the computational result of the local operation unit 12 or the secret computation unit 14 becomes a share $[a^\nu]$ obtained by applying additive secret sharing to the ν-th power of data "a", the output unit 15 outputs the share $[a^\nu]$.

Second Embodiment

Figure 4:
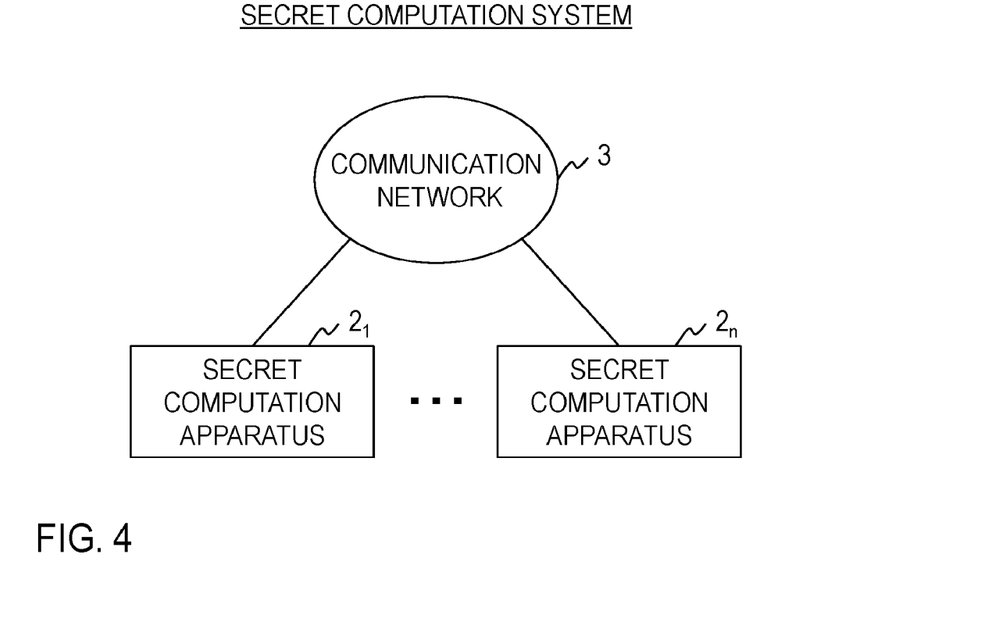
FIG. 4 is a diagram showing an example of the functional configuration of a secret computation system according to a second embodiment.

In a second embodiment, a secret computation system can detect falsification made in power computation using secret computation. The secret computation system of the second embodiment includes n (≥3) secret computation apparatuses $2_1, \ldots,$ and $2_n$, as exemplified in FIG. 4.

Figure 5:
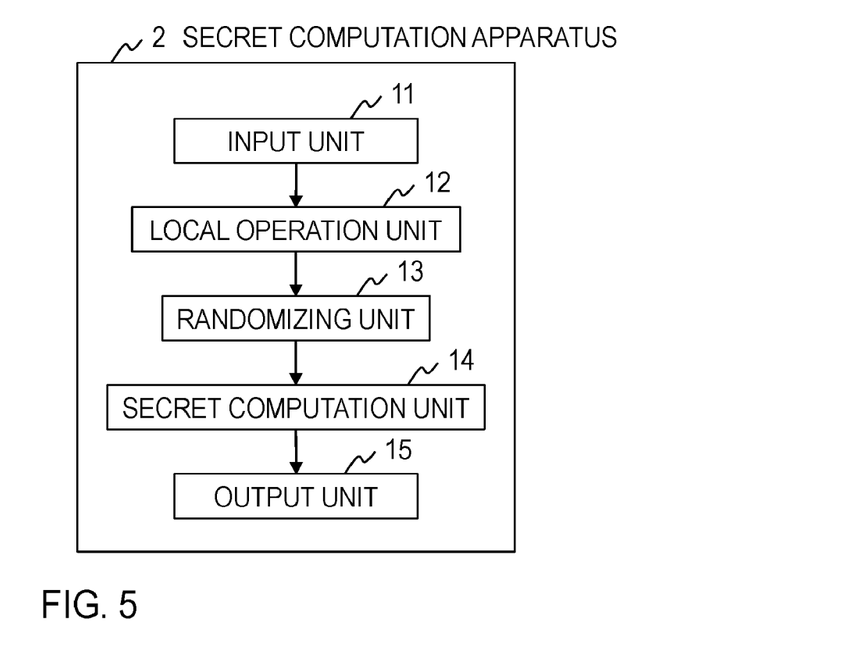
FIG. 5 is a diagram showing an example of the functional configuration of a secret computation apparatus according to the second embodiment.

The secret computation apparatus 2 includes an input unit 11, a local operation unit 12, a randomizing unit 13, a secret computation unit 14, and an output unit 15, as exemplified in FIG. 5. A secret computation method of the second embodiment is implemented when this secret computation apparatus 2 executes the processes of steps exemplified in FIG. 6 in cooperation with other secret computation apparatuses 2.

Figure 6:
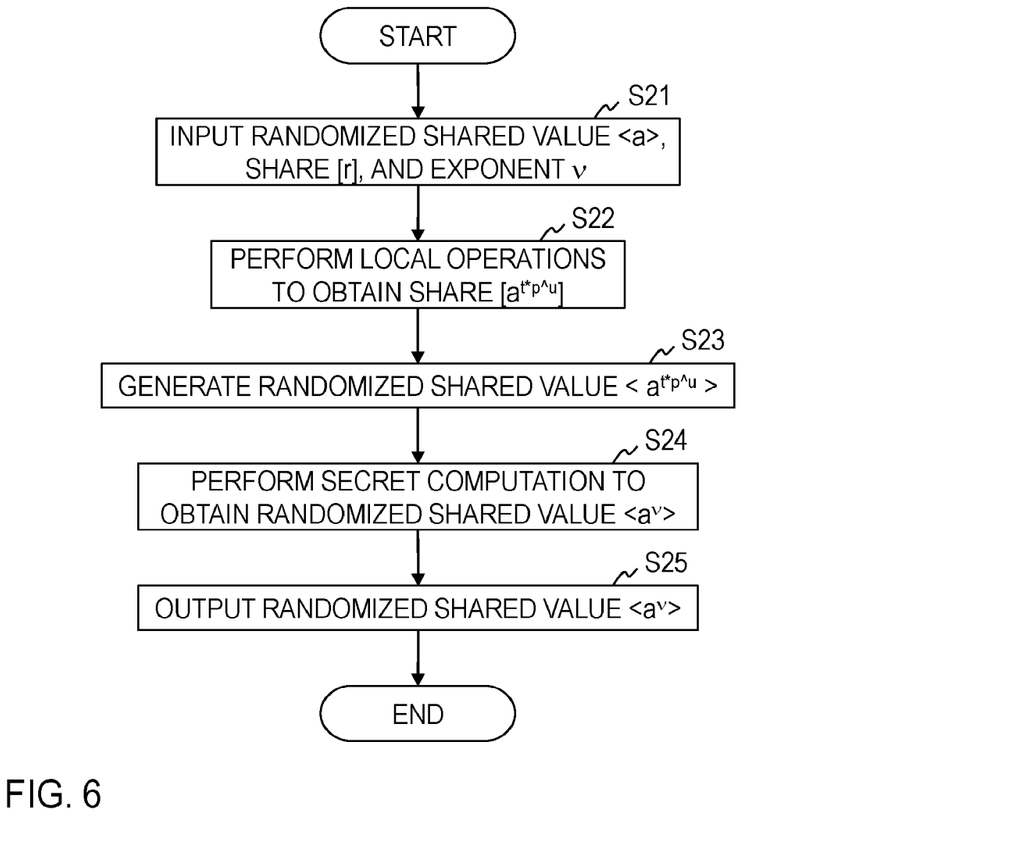
FIG. 6 is a diagram showing an example of the processing procedure of a secret computation method according to the second embodiment.

The processing procedure of the secret computation method in the second embodiment will be described below with reference to FIG. 6.

In step S21, a randomized shared value <a>:=([a], [ra]) obtained by applying additive secret sharing to data "a", which is subjected to operations, a share [r] obtained by applying additive secret sharing to the random number "r" used when the randomized shared value <a> was generated, and the exponent ν of a power to be applied to data "a" are input to the input unit 11. The randomized shared value <a>, the share [r], and the exponent ν are sent to the local operation unit 12.

In step S22, without performing communication with another secret computation apparatus, the local operation unit 12 computes the power of a power of a characteristic, that is, the $p^u$-th power, of a share $[a^t]$ obtained by applying additive secret sharing to the t-th power of data "a" and obtains a share $$[a^{t*p^{\wedge}u}]$$

by applying additive secret sharing to the $p^u$-th power of data "a". That is, $$[a^{t*p^{\wedge}u}] := LocalExp([a^t], p^u)$$

is computed. The share $$[a^{t*p^{\wedge}u}]$$

is sent to the randomizing unit 13.

In step S23, the randomizing unit 13 performs secret computation in cooperation with other secret computation apparatuses to multiply the computation result $$[a^{(t*p^{\wedge}u)}]$$

of the local operation unit 12 with a share [r] obtained by applying additive secret sharing to a random number "r". That is, $$[ra^{(t*p^{\wedge}u)}]$$

←Mult $$([a^{(t*p^{\wedge}u)}],$$

[r]) is computed. With this, a randomized shared value $$\langle a^{(t*p^{\wedge}u)} \rangle := ([a^{(t*p^{\wedge}u)}],$$

$[ra^{(t*p^u)}])$ of the $p^u$-th power of data $a^t$ is generated. The randomizing unit 13 may also multiply the computation result $[a^{(t*p^u)}]$ of the local operation unit 12 with the first component $[ra^s]$ of another randomized shared value $\langle a^s \rangle := ([a^s], [ra^s])$. That is, $[ra^{(t*p^u)+s}]$ ←Mult $([a^{(t*p^u)}],$ $[ra^s])$ may be computed, wherein "s" is an integer equal to or larger than 1 and satisfies $t*p^u+s \leq v$. At the same time, the secret computation unit 14 can multiply the computation result $[a^{(t*p^u)+s}]$ of the local operation unit 12 with the 0th component $[a^s]$ of another randomized shared value $\langle a^s \rangle := ([a^s], [ra^s])$ to obtain $[a^{(t*p^u)+s}]$ ←Mult $([a^{(t*p^u)}],$ $[a^s])$ to generate a randomized shared value $\langle a^{(t*p^u)+s} \rangle := ([a^{(t*p^u)+s}], [ra^{(t*p^u)+s}])$ of the product of the $p^u$-th power of data "$a^t$" and data "$a^s$".

In step S24, the secret computation unit 14 performs secret computation in cooperation with other secret computation apparatuses to multiply a randomized shared value $\langle a^\alpha \rangle := ([a^\alpha], [ra^\alpha])$ obtained by applying additive secret sharing to the α-th power of data "a", with a randomized shared value $\langle a^\beta \rangle := ([a^\beta], [ra^\beta])$ obtained by applying additive secret sharing to the β-th power of data "a". The above-described DoubleMult can be used for this multiplication. That is, $\langle a^{\alpha+\beta} \rangle \leftarrow \text{DoubleMult}(([a^\alpha], [a^\alpha]), ([a^\beta], [ra^\beta]))$ is computed. The above-described Mult may be executed twice in parallel. That is, $[a^{\alpha+\beta}] \leftarrow \text{Mult}([a^\alpha], [a^\beta])$ and $[ra^{\alpha+\beta}] \leftarrow \text{Mult}([a^\alpha], [ra^\beta])$ are computed, and $[a^{\alpha+\beta}]$ and $[ra^{\alpha+\beta}]$ are combined to generate $\langle a^{\alpha+\beta} \rangle := ([a^{\alpha+\beta}], [ra^{\alpha+\beta}])$. Either $\langle a^\alpha \rangle$ or $\langle a^\beta \rangle$ is a randomized shared value $\langle a^{t*p^u} \rangle$ obtained by applying additive secret sharing to the $p^u$-th power of data "$a^t$". That is, $\alpha = t*p^u$ or $\beta = t*p^u$. The secret computation unit 14 may execute these operations a plurality of number of times to obtain a randomized shared value $\langle a^v \rangle$ obtained by applying additive secret sharing of the v-th power of data "a".

In step S25, when the computational result of the randomizing unit 13 or the secret computation unit 14 becomes a randomized shared value $\langle a^v \rangle$ obtained by applying additive secret sharing to the v-th power of data "a", the output unit 15 outputs the randomized shared value $\langle a^v \rangle$.

Specific Examples

Specific protocols implemented by the foregoing embodiments will be shown below. In the following specific examples, three-party secret computation is assumed. However, secret computation technology according to the present invention is not limited to three-party secret computation. In the following specific examples, $GF(2^8)$ and $GF(3^3)$ are used as examples. However, the characteristic is not limited to 2 or 3, nor is the degree of field extension limited to 8 or 3.

In a first specific example, the protocol computes a power in secret computation on a field $GF(2^8)$. Here, a protocol that computes $[a^{21}]$ from $[a]$ is shown.

Input: [a]
Output: $[a^{21}]$
1. $[a^{16}] := \text{LocalExp}([a], 2^4)$
2. $[a^4] := \text{LocalExp}([a], 2^2)$
3. $[a^{20}] \leftarrow \text{Mult}([a^{16}], [a^4])$
4. $[a^{21}] \leftarrow \text{Mult}([a^{20}], [a^1])$
5. return $[a^{21}]$ In the above-described protocol, Mult is performed twice, and the number of communication rounds is two. In contrast, when $[a^{21}]$ is computed with the Binary method, Mult is required to be performed six times, as shown in the protocol below. It is found that the number of communication rounds is greatly reduced.

Input: [a]
Output: $[a^{21}]$
1. $[a^2] \leftarrow \text{Mult}([a], [a])$
2. $[a^4] \leftarrow \text{Mult}([a^2], [a^2])$
3. $[a^5] \leftarrow \text{Mult}([a^4], [a])$
4. $[a^{10}] \leftarrow \text{Mult}([a^5], [a^5])$
5. $[a^{20}] \leftarrow \text{Mult}([a^{10}], [a^{10}])$
6. $[a^{21}] \leftarrow \text{Mult}([a^{20}], [a])$
7. return $[a^{21}]$ In a second specific example, the protocol obtains an inverse element in secret computation on a field $GF(2^8)$. Here, a protocol that computes the inverse element $[a^{-1}]$ from $[a]$ is shown. Since $[a^{-1}]$ $[a^{254}]$ from the Fermat's little theorem, obtaining the inverse element is equal to computing the 254th power.

Input: [a]
Output: $[a^{-1}] = [a^{254}]$
1. $[a^2] := \text{LocalExp}([a], 2)$
2. $[a^3] \leftarrow \text{Mult}([a^2], [a])$
3. $[a^{12}] := \text{LocalExp}([a^3], 2^2)$
4. $[a^{15}] \leftarrow \text{Mult}([ra^{12}], [a^3])$
5. $[a^{14}] \leftarrow \text{Mult}([a^{12}], [a^2])$
6. $[a^{240}] := \text{LocalExp}([a^{15}], 2^4)$
7. $[a^{254}] \leftarrow \text{Mult}([a^{240}], [a^{14}])$
8. return $[a^{254}]$ In the above-described protocol, since line 4 and line 5 can be executed in parallel, the number of communication rounds is three. In contrast, when $[a^{-1}]$ is computed with the Binary method, Mult is required to be performed 13 times, as shown in the protocol below. It is found that the number of communication rounds is greatly reduced.

Input: [a]
Output: $[a^{-1}]=[a^{254}]$
1. $[a^2] \leftarrow \text{Mult}([a], [a])$
2. $[a^3] \leftarrow \text{Mult}([a^2], [a])$
3. $[a^6] \leftarrow \text{Mult}([a^3], [a^3])$
4. $[a^7] \leftarrow \text{Mult}([a^6], [a])$
5. $[a^{14}] \leftarrow \text{Mult}([a^7], [a^7])$
6. $[a^{15}] \leftarrow \text{Mult}([a^{14}], [a])$
7. $[a^{30}] \leftarrow \text{Mult}([a^{30}], [a^{30}])$
8. $[a^{31}] \leftarrow \text{Mult}([a^{30}], [a])$
9. $[a^{62}] \leftarrow \text{Mult}([a^{32}], [a^{32}])$
10. $[a^{63}] \leftarrow \text{Mult}([a^{62}], [a])$
11. $[a^{126}] \leftarrow \text{Mult}([a^{63}], [a^{63}])$
12. $[a^{127}] \leftarrow \text{Mult}([a^{126}], [a])$
13. $[a^{254}] \leftarrow \text{Mult}([a^{127}], [a^{127}])$
14. return $[a^{254}]$ In a third specific example, the power protocol in secret computation on the field $GF(2^8)$ is applied to falsification detection. Here, a protocol that computes $<a^{21}>=([a^{21}], [ra^{21}])$ from $<a>=([a], [ra])$ is shown. In the following protocol, in order to avoid computing a power of a randomized share, the multiplication of a random number is performed by Mult after local operations.

Input: $<a>=([a], [ra]), [r]$
Output: $<a^{21}>=([a^{21}], [ra^{21}])$
1. $[a^{16}] := \text{LocalExp}([a], 2^4)$
2. $[a^4] := \text{LocalExp}([a], 2^2)$
3. $[ra^4] \leftarrow \text{Mult}([a^4], [r])$
4. $([a^{20}], [ra^{20}]) \leftarrow \text{DoubleMult}(([a^{16}], [a^{16}]), ([a^4], [ra^4]))$
5. $([a^{21}], [ra^{21}]) \leftarrow \text{DoubleMult}(([a], [a]), ([a^{20}], [ra^{20}]))$
6. return $<a^{21}>=([a^{21}], [ra^{21}])$ In a fourth specific example, the inverse-element protocol in secret computation on the field $GF(2^8)$ is applied to falsification detection. Here, a protocol that computes $<a^{-1}>=<a^{254}>=([a^{254}], [ra^{254}])$, the inverse element of $<a>=([a], [ra])$, is shown. In the following protocol, in order to avoid computing a power of a randomized share, the multiplication of a random number is performed by Mult after local operations.

Input: $<a>=([a], [ra]), [r]$
Output: $<a^{-1}>=<a^{254}>=([a^{254}], [ra^{254}])$
1. $[a^2] := \text{LocalExp}([a], 2)$
2. $[ra^2] \leftarrow \text{Mult}([a^2], [r])$
3. $([a^3], [ra^3]) \leftarrow \text{DoubleMult}(([a], [a]), ([a^2], [ra^2]))$
4. $[a^{12}] := \text{LocalExp}([a^3], 2^2)$
5. $([a^{15}], [ra^{15}]) \leftarrow \text{DoubleMult}(([a^{12}], [a^{12}]), ([a^3], [ra^3]))$
6. $([a^{14}], [ra^{14}]) \leftarrow \text{DoubleMult}(([a^{12}], [a^{12}]), ([a^2], [ra^2]))$
7. $[a^{240}] := \text{LocalExp}([a^{15}], 2^4)$
8. $([a^{254}], [ra^{254}]) \leftarrow \text{DoubleMult}(([a^{240}], [a^{240}]), ([a^{14}], [ra^{14}]))$
9. return $<a^{254}>=([a^{254}], [ra^{254}])$ In a fifth specific example, the protocol computes a power in secret computation on a field $GF(3^3)$. Here, a protocol that computes $[a^{10}]$ from [a] is shown.

Input: [a]
Output: $[a^{10}]$
1. $[a^9] := \text{LocalExp}([a], 3^2)$
2. $[a^{10}] \leftarrow \text{Mult}([a^9], [a])$
3. return $[a^{10}]$ In the above-described protocol, Mult is performed once and the number of communication rounds is one. In contrast, when $[a^{10}]$ is computed with the Binary method, Mult is required to be performed four times, as shown in the protocol below. It is found that the number of communication rounds is greatly reduced.

Input: [a]
Output: $[a^{10}]$
1. $[a^2] \leftarrow \text{Mult}([a], [a])$
2. $[a^4] \leftarrow \text{Mult}([a^2], [a^2])$
3. $[a^5] \leftarrow \text{Mult}([a^4], [a])$
4. $[a^{10}] \leftarrow \text{Mult}([a^5], [a^5])$
5. return $[a^{10}]$ In a sixth specific example, the protocol obtains an inverse element in secret computation on a field $GF(3^3)$. Here, a protocol that computes the inverse element $[a^{-1}]$ from [a] is shown. Since $[a^{-1}]=[a^{25}]$ from the Fermat's little theorem, obtaining the inverse element is equal to computing the 25th power.

Input: [a]
Output: $[a^{-1}]=[a^{25}]$
1. $[a^9] := \text{LocalExp}([a], 3^2)$
2. $[a^3] := \text{LocalExp}([a], 3)$
3. $[a^{12}] \leftarrow \text{Mult}([a^9], [a^3])$
4. $[a^{24}] \leftarrow \text{Mult}([a^{12}], [a^{12}])$
5. $[a^{25}] \leftarrow \text{Mult}([a^{24}], [a])$
8. return $[a^{25}]$ In the above-described protocol, Mult is performed three times, and parallel operations are not possible. Therefore, the number of communication rounds is three. In contrast, when $[a^{-1}]$ is computed with the Binary method, Mult is required to be performed six times, as shown in the protocol below. It is found that the number of communication rounds is greatly reduced.

Input: [a]
Output: $[a^{-1}]=[a^{25}]$
1. $[a^2] \leftarrow \text{Mult}([a], [a])$
2. $[a^3] \leftarrow \text{Mult}([a^2], [a])$
3. $[a^6] \leftarrow \text{Mult}([a^3], [a^3])$
4. $[a^{12}] \leftarrow \text{Mult}([a^6], [a^6])$
5. $[a^{24}] \leftarrow \text{Mult}([a^{12}], [a^{12}])$
6. $[a^{25}] \leftarrow \text{Mult}([a^{24}], [a])$
7. return $[a^{25}]$ In a seventh specific example, the power protocol in secret computation on the field $GF(3^3)$ is applied to falsification detection. Here, a protocol that computes $<a^{10}>=([a^{10}], [ra^{10}])$ from $<a>=([a], [ra])$ is shown. In the following protocol, in order to avoid computing a power of a randomized share, the multiplication of a random number is performed by Mult after local operations.

Input: $<a>=([a], [ra]), [r]$
Output: $<a^{10}>=([a^{10}], [ra^{10}])$
1. $[a^9] := \text{LocalExp}([a], 3^2)$
2. $([a^{10}], [ra^{10}]) \leftarrow \text{DoubleMult}(([a^9], [a^9]), ([a], [ra]))$
3. return $<a^{10}>=([a^{10}], [ra^{10}])$ In an eighth specific example, the inverse-element protocol in secret computation on the field $GF(3^3)$ is applied to falsification detection. Here, a protocol that computes $<a^{-1}>=<a^{25}>=([a^{25}], [ra^{25}])$, the inverse element of $<a>=([a], [ra])$, is shown. In the following protocol, in order to avoid computing a power of a randomized share, the multiplication of a random number is performed by Mult after local operations.

Input: $<a>=([a], [ra]), [r]$
Output: $<a^{-1}>=<a^{25}>=([a^{25}], [ra^{25}])$
1. $[a^9] := \text{LocalExp}([a], 3^2)$
2. $[a^3] := \text{LocalExp}([a], 3)$
3. $[ra^3] \leftarrow \text{Mult}([a^3], [r])$
4. $([a^{12}], [ra^{12}]) \leftarrow \text{DoubleMult}(([a^9], [a^9]), ([a^3], [ra^3]))$ 5. $([a^{24}], [ra^{24}]) \leftarrow \text{DoubleMult}(([a^{12}], [a^{12}]), ([a^{12}], [ra^{12}]))$ 6. $([a^{25}], [ra^{25}]) \leftarrow \text{DoubleMult}(([a^{24}], [a^{24}]), ([a], [ra]))$ 7. return $<a^{25}>=([a^{25}], [ra^{25}])$ According to secret computation technology of the present invention, the following formula on the extended field is used to locally compute the power of a power of a characteristic, reducing the number of communication rounds used in the entire power computation. Therefore, a power can be computed at high speed while data is concealed. By applying this technology, inverse-element computation that uses a power can be executed at high speed.

$$a^{p^\mu} = \left(\sum_{i=0}^{m-1} a_i\right)^{p^\mu} = a_0^{p^\mu} + \ldots + a_{m-1}^{p^\mu}$$

Embodiments of the present invention have been described above. However, a specific configuration of the present invention is not limited to those in the above described embodiments. Even if a design change is made to the above embodiments, if necessary, without departing from the scope of the present invention, it is needless to say that those changes are included in the present invention. Each type of processing described in the above embodiments may be executed not only time sequentially according to the order of description but also in parallel or individually when necessary or according to the processing capabilities of the apparatuses that execute the processing.

Program and Recording Medium

When various types of processing functions in each apparatus, described in the embodiments, are implemented by a computer, the processing details of the functions that should be provided by each apparatus are described in a program. When the program is executed by the computer, the processing functions in each apparatus are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

This program is distributed by selling, transferring, or lending a portable recording medium, such as a DVD or a CD-ROM, with the program recorded on it, for example. The program may also be distributed by storing the program in a storage of a server computer and transferring the program from the server computer to another computer through the network.

A computer that executes this type of program first stores the program recorded on the portable recording medium or the program transferred from the server computer in its storage, for example. Then, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the apparatuses are implemented by executing the predetermined programs on the computer, but at least a part of the processing details may be implemented by hardware.

What is claimed is:

1. A secret computation method in which $GF(p^k)$ is an extended field having a characteristic of p and a degree k of field extension, a is data that is an element of the extended field $GF(p^k)$, [a] is a share obtained by applying additive secret sharing to data a, v is an integer equal to or larger than 2, and m, u and t are integers equal to or larger than 1 and satisfy $$t * p^u \leq v,$$

LocalExp is a local power operation, and Mult is a multiplication, the secret computation method computing a share $[a^v]$ of the v-th power of data a from a share [a] of data a while data a is concealed and being executed by a secret computation system that includes three or more secret computation apparatuses, the secret computation method comprising:

receiving, over a network, an input of a respective share [a] of the data a at each of the three or more secret computation apparatuses, wherein the data a is concealed from each of the three or more secret computation apparatuses, and the share [a] represents a divided share of the data a;

obtaining the $p^u$-th power of a share $[a^t]$ of the t-th power of data a by computing $$[a^{(t*p^\wedge u)}]$$

in a local operation unit of each of the three or more secret computation apparatuses, using a local power operation that computes a power of a share of concealed data based on a characteristic called Frobenius endomorphism; and obtaining the share $[a^v]$ in a secret computation unit of the each of the three or more secret computation apparatuses by a calculation that includes a multiplication of the share $$[a^{(t*p^\wedge u)}],$$

a computation result of the local operation unit, and a share $[a^m]$, using secret computation that requires communication with the other secret computation apparatuses by using random numbers for concealing, wherein when p=2, v=254, the secret computation method computes $[a^2]:=\text{LocalExp}([a], 2),$ $[a^3] \leftarrow \text{Mult}([a^2], [a])$,
$[a^{12}] := \text{LocalExp}([a^3], 2^2)$,
$[a^{15}] \leftarrow \text{Mult}([a^{12}], [a^3])$,
$[a^{14}] \leftarrow \text{Mult}([a^{12}], [a^2])$,
$[a^{240}] := \text{LocalExp}([a^{15}], 2^4)$, and
$[a^{254}] \leftarrow \text{Mult}([a^{240}], [a^{14}])$.

2. A secret computation method in which $GF(p^k)$ is an extended field having a characteristic of p and a degree k of field extension, a is data that is an element of the extended field $GF(p^k)$, r is a random number that is an element of the extended field $GF(p^k)$, [a] is a share obtained by applying additive secret sharing to data a, $<a>:=([a], [ra])$ is a randomized shared value of data a, v is an integer equal to or larger than 2, and m, u and t are integers equal to or larger than 1 and satisfy $t*p^u \leq v$, LocalExp is a local power operation, Mult is a multiplication, and DoubleMult is an operation in which two pairs of secure text are input, the secret computation method computing a randomized shared value $<a^v>:=([a^v], [ra^v])$ of the v-th power of data a from a randomized shared value [a] of data a while data a is concealed and being executed by a secret computation system that includes three or more secret computation apparatuses, the secret computation method comprising:

receiving, over a network, an input of a respective share [a] of the data a at each of the three or more secret computation apparatuses, wherein the data a is concealed from each of the three or more secret computation apparatuses, and the share [a] represents a divided share of the data a;

obtaining the $p^u$-th power of a share $[a^t]$ of the t-th power of data a by computing $$[a^{(t*p^{\wedge}u)}]$$

in a local operation unit of each of the three or more secret computation apparatuses, using a local power operation that computes a power of a share of concealed data based on a characteristic called Frobenius endomorphism;

obtaining a randomized shared value $$\langle a^{(t*p^{\wedge}u)} \rangle := ([a^{(t*p^{\wedge}u)}], [ra^{(t*p^{\wedge}u)}])$$

of a computation result of the local operation unit in a randomizing unit of the each of the three or more secret computation apparatuses by multiplying $$[a^{(t*p^{\wedge}u)}],$$

the computation result of the local operation unit, with a share [r] of the random number r using secret computation that requires communication with the other secret computation apparatuses; and obtaining the randomized shared value $<a^v>$ in a secret computation unit of the each of the three or more secret computation apparatuses by a calculation that includes a multiplication of a randomized shared value $$\langle a^{(t*p^{\wedge}u)} \rangle$$

of the computation result of the local operation unit and a share $[a^m]$, using secret computation that requires communication with the other secret computation apparatuses by using random numbers for concealing, wherein when p=2, v=254, the secret computation method computes $[a^2] := \text{LocalExp}([a], 2)$,
$[ra^2] \leftarrow \text{Mult}([a^2], [r])$,
$([a^3], [ra^3]) \leftarrow \text{DoubleMult}(([a], [a]), ([a^2], [ra^2]))$,
$[a^{12}] := \text{LocalExp}([a^3], 2^2)$,
$([a^{15}], [ra^{15}]) \leftarrow \text{DoubleMult}(([a^{12}], [a^{12}]), ([a^3], [ra^3]))$,
$([a^{14}], [ra^{14}]) \leftarrow \text{DoubleMult}(([a^{12}], [a^{12}]), ([a^2], [ra^2]))$,
$[a^{240}] := \text{LocalExp}([a^{15}], 2^4)$, and
$([a^{254}], [ra^{254}]) \leftarrow \text{DoubleMult}(([a^{240}], [a^{240}]), ([a^{14}], [ra^{14}]))$.

3. A secret computation system in which $GF(p^k)$ is an extended field having a characteristic of p and a degree k of field extension, a is data that is an element of the extended field $GF(p^k)$, [a] is a share obtained by applying additive secret sharing to data a, v is an integer equal to or larger than 2, and m, u and t are integers equal to or larger than 1 and satisfy $t*p^u \leq v$, LocalExp is a local power operation, and Mult is a multiplication, the secret computation system comprising three or more secret computation apparatuses to compute a share $[a^v]$ of the v-th power of data a from a share [a] of data a while data a is concealed, each of the secret computation apparatuses comprising processing circuitry configured to:

receive, over a network, an input of a respective share [a] of the data a at each of the three or more secret computation apparatuses, wherein the data a is concealed from each of the three or more secret computation apparatuses, and the share [a] represents a divided share of the data a;

obtain the $p^u$-th power of a share $[a^t]$ of the t-th power of data a by computing $$[a^{(t*p^{\wedge}u)}],$$

using a local power operation that computes a power of a share of concealed data based on a characteristic called Frobenius endomorphism; and obtain the share $[a^v]$ by a calculation that includes a multiplication of the share $$[a^{(t*p^{\wedge}u)}],$$

a computation result of the local power operation, and a share $[a^m]$, using secret computation that requires communication with the other secret computation apparatuses by using random numbers for concealing, wherein when p=2, v=254, the secret computation system computes $[a^2] := \text{LocalExp}([a], 2)$,

[$a^3$]←Mult([$a^2$], [a]),
[$a^{12}$]:=LocalExp([$a^3$], $2^2$),
[$a^{15}$]←Mult([$a^{12}$], [$a^3$]),
[$a^{14}$]←Mult([$a^{12}$], [$a^2$]),
[$a^{240}$]:=LocalExp([$a^{15}$], $2^4$), and
[$a^{254}$]←Mult([$a^{240}$], [$a^{14}$]).

4. A secret computation system in which GF($p^k$) is an extended field having a characteristic of p and a degree k of field extension, a is data that is an element of the extended field GF($p^k$), r is a random number that is an element of the extended field GF($p^k$), [a] is a share obtained by applying additive secret sharing to data a, <a>:=([a], [ra]) is a randomized shared value of data a, v is an integer equal to or larger than 2, and m, u and t are integers equal to or larger than 1 and satisfy t*$p^u$≤v, LocalExp is a local power operation, Mult is a multiplication, and DoubleMult is an operation in which two pairs of secure text are input, the secret computation system comprising three or more secret computation apparatuses to compute a randomized shared value <$a^v$>:=([$a^v$], [$ra^v$]) of the v-th power of data a from a randomized shared value [a] of data a while data a is concealed, each of the secret computation apparatuses comprising processing circuitry configured to:

receive, over a network, an input of a respective share [a] of the data a at each of the three or more secret computation apparatuses, wherein the data a is concealed from each of the three or more secret computation apparatuses, and the share [a] represents a divided share of the data a;

obtain the $p^u$-th power of a share [$a^t$] of the t-th power of data a by computing $$[a^{(t*p^{\wedge}u)}],$$

using a local power operation that computes a power of a share of concealed data based on a characteristic called Frobenius endomorphism;

obtain a randomized shared value $$\langle a^{(t*p^{\wedge}u)} \rangle := ([a^{(t*p^{\wedge}u)}], [ra^{(t*p^{\wedge}u)}])$$

of a computation result of the local power operation by multiplying $$[a^{(t*p^{\wedge}u)}],$$

the computation result of the local power operation, with a share [r] of the random number r using secret computation that requires communication with the other secret computation apparatuses; and obtain the randomized shared value <$a^v$> by a calculation that includes a multiplication of a randomized shared value $$\langle a^{(t*p^{\wedge}u)} \rangle$$

of the computation result of the local power operation and a share [$a^m$], using secret computation that requires communication with the other secret computation apparatuses by using random numbers for concealing, wherein when p=2, v=254, the secret computation system computes

[$a^2$]:=LocalExp([a], 2),
[$ra^2$]←Mult([$a^2$], [r]),
([$a^3$], [$ra^3$])←DoubleMult((([a], [a]), ([$a^2$], [$ra^2$])),
[$a^{12}$]:=LocalExp([$a^3$], $2^2$),
([$a^{15}$], [$ra^{15}$])←DoubleMult((([$a^{12}$], [$a^{12}$]), ([$a^3$], [$ra^3$])),
([$a^{14}$], [$ra^{14}$])←DoubleMult((([$a^{12}$], [$a^{12}$]), ([$a^2$], [$ra^2$])),
[$a^{240}$]:=LocalExp([$a^{15}$], $2^4$), and
([$a^{254}$], [$ra^{254}$])←DoubleMult((([$a^{240}$], [$a^{240}$]), ([$a^{14}$], [$ra^{14}$])).

5. A secret computation apparatus included in a secret computation system in which GF($p^k$) is an extended field having a characteristic of p and a degree k of field extension, a is data that is an element of the extended field GF($p^k$), [a] is a share obtained by applying additive secret sharing to data a, v is an integer equal to or larger than 2, and m, u and t are integers equal to or larger than 1 and satisfy t*$p^u$≤v, LocalExp is a local power operation, and Mult is a multiplication, the secret computation system computing a share [$a^v$] of the v-th power of data a from a share [a] of data a while data a is concealed, the secret computation apparatus comprising processing circuitry configured to:

receive, over a network, an input of a respective share [a] of the data a at each of the three or more secret computation apparatuses, wherein the data a is concealed from each of the three or more secret computation apparatuses, and the share [a] represents a divided share of the data a;

obtain the $p^u$-th power of a share [$a^t$] of the t-th power of data a by computing $$[a^{(t*p^{\wedge}u)}],$$

using a local power operation that computes a power of a share of concealed data based on a characteristic called Frobenius endomorphism; and obtain the share [$a^v$] by a calculation that includes a multiplication of the share $$[a^{(t*p^{\wedge}u)}],$$

a computation result of the local power operation, and a share [$a^m$], using secret computation that requires communication with another secret computation apparatus by using random numbers for concealing, wherein when p=2, v=254, the secret computation system computes

[$a^2$]:=LocalExp([a], 2),
[$a^3$]←Mult([$a^2$], [a]),
[$a^{12}$]:=LocalExp([$a^3$], $2^2$),
[$a^{15}$]←Mult([$a^{12}$], [$a^3$]),
[$a^{14}$]←Mult([$a^{12}$], [$a^2$]),
[$a^{240}$]:=LocalExp([$a^{15}$], $2^4$), and
[$a^{254}$]←Mult([$a^{240}$], [$a^{14}$]).

6. A secret computation apparatus included in a secret computation system in which $GF(p^k)$ is an extended field having a characteristic of p and a degree k of field extension, a is data that is an element of the extended field $GF(p^k)$, r is a random number that is an element of the extended field $GF(p^k)$, [a] is a share obtained by applying additive secret sharing to data a, $<a>:=([a], [ra])$ is a randomized shared value of data a, v is an integer equal to or larger than 2, and m, u and t are integers equal to or larger than 1 and satisfy $t*p^u \leq v$, LocalExp is a local power operation, Mult is a multiplication, and DoubleMult is an operation in which two pairs of secure text are input, the secret computation system computing a randomized shared value $<a^v>:=([a^v], [ra^v])$ of the v-th power of data a from a randomized shared value [a] of data a while data a is concealed, the secret computation apparatus comprising processing circuitry configured to:

receive, over a network, an input of a respective share [a] of the data a at each of the three or more secret computation apparatuses, wherein the data a is concealed from each of the three or more secret computation apparatuses, and the share [a] represents a divided share of the data a;

obtain the $p^u$-th power of a share $[a^t]$ of the t-th power of data a by computing $[a^{(t*p^{\wedge}u)}]$, using a local power operation that computes a power of a share of concealed data based on a characteristic called Frobenius endomorphism;

obtain a randomized shared value $\langle a^{(t*p^{\wedge}u)} \rangle := ([a^{(t*p^{\wedge}u)}], [ra^{(t*p^{\wedge}u)}])$ of a computation result of the local power operation by multiplying $[a^{(t*p^{\wedge}u)}]$, the computation result of the local power operation, with a share [r] of the random number r using secret computation that requires communication with another secret computation apparatus; and obtain the randomized shared value $<a^v>$ by a calculation that includes a multiplication of a randomized shared value $\langle a^{(t*p^{\wedge}u)} \rangle$ of the computation result of the local power operation and a share $[a^m]$, using secret computation that requires communication with another secret computation apparatus by using random numbers for concealing, wherein when p=2, v=254, the secret computation s stem computes $[a^2]:=LocalExp([a], 2)$,
$[ra^2]\leftarrow Mult([a^2], [r])$,
$([a^3], [ra^3])\leftarrow DoubleMult(([a], [a]), ([a^2], [ra^2]))$,
$[a^{12}]:=LocalExp([a^3], 2^2)$,
$([a^{15}], [ra^{15}])\leftarrow DoubleMult(([a^{12}], [a^{12}]), ([a^3], [ra^3]))$,
$([a^{14}], [ra^{14}])\leftarrow DoubleMult(([a^{12}], [a^{12}]), ([a^2], [ra^2]))$,
$[a^{240}]:=LocalExp([a^{15}], 2^4)$, and
$([a^{254}], [ra^{254}])\leftarrow DoubleMult(([a^{240}], [a^{240}]), ([a^{14}], [ra^{14}]))$.

7. A computer program product stored on non-transitory computer-readable storage medium containing instructions, the instructions executed by a computer to function as the secret computation apparatus according to claim 5.

8. A computer program product stored on non-transitory computer-readable storage medium containing instructions, the instructions executed by a computer to function as the secret computation apparatus according to claim 6.

* * * * *